(12) United States Patent
Ashe

(10) Patent No.: US 8,425,106 B2
(45) Date of Patent: Apr. 23, 2013

(54) FLOW REACTOR

(75) Inventor: Robert Ashe, Fleet (GB)

(73) Assignee: Ashe Morris Ltd., Chesire (GB)

( * ) Notice: Subject to any disclaimer, the term of this patent is extended or adjusted under 35 U.S.C. 154(b) by 970 days.

(21) Appl. No.: 12/517,913

(22) PCT Filed: Dec. 6, 2007

(86) PCT No.: PCT/EP2007/010603
§ 371 (c)(1), (2), (4) Date: Jun. 5, 2009

(87) PCT Pub. No.: WO2008/068019
PCT Pub. Date: Jun. 12, 2008

(65) Prior Publication Data
US 2011/0003375 A1   Jan. 6, 2011

(30) Foreign Application Priority Data

Dec. 6, 2006 (GB) .................................. 0624374.5
Dec. 8, 2006 (GB) .................................. 0624543.5

(51) Int. Cl.
*B01F 15/06* (2006.01)
(52) U.S. Cl.
USPC ........... 366/149; 366/102; 366/103; 366/110; 366/117; 366/119
(58) Field of Classification Search .................. 366/102, 366/103, 110, 117, 119, 149
See application file for complete search history.

(56) References Cited

U.S. PATENT DOCUMENTS

| | | | |
|---|---|---|---|
| 4,797,005 A | * | 1/1989 | Landsberger ................. 366/343 |
| 2003/0064507 A1 | | 4/2003 | Gallagher |
| 2005/0220668 A1 | | 10/2005 | Coville |
| 2005/0277187 A1 | | 12/2005 | Johnson |

FOREIGN PATENT DOCUMENTS

| | | |
|---|---|---|
| EP | 1729136 A1 | 12/2006 |
| JP | 2007/054817 A1 | 3/2007 |
| WO | 03/054509 | 7/2003 |
| WO | 2006/120026 A2 | 11/2006 |
| WO | 2006/120027 A1 | 11/2006 |
| WO | 2006/120028 A1 | 11/2006 |
| WO | 2006/120945 | 11/2006 |

OTHER PUBLICATIONS

"Adaptive Predictive Control of a Multistage Fermentation Process" (Biotechnology and Bioengineering, vol. 35, pp. 217-223 (1990)) to Vigié et al.*
International Preliminary Report on Patentability dated Jun. 18, 2008.
International Search Report dated Mar. 26, 2008 (WO2008/068019).
Browne et al., Continuous Flow Processing of Slurries: Evaluation of Agitated Cell Reactor, Organic Process Research and Development.
Ashe, Shaken not Stirred, Jul. 2010 Reactor Design www.tcetoday.com.

* cited by examiner

*Primary Examiner* — Yogendra Gupta
*Assistant Examiner* — John Robitaille
(74) *Attorney, Agent, or Firm* — The Dobrusin Law Firm, P.C.

(57) ABSTRACT

A reaction system and a reactor which comprises of two or more reaction cells wherein said cells are separated by inter cell conduits and having a means of causing agitation within the cells which does not require a mechanical connection of the agitating mechanism within the cell to a drive mechanism which is outside the cell.

17 Claims, 2 Drawing Sheets

FLOW REACTOR

CLAIM OF BENEFIT OF FILING DATE

The present application claims the benefit of the filing date of PCT Application Serial No. PCT/EP2007/010603 (filed Dec. 6, 2007) (Published as WO 2008/068019); GB 0624374.5 (filed Dec. 6, 2006), and GB 0624543.5 (filed Dec. 8, 2006), the contents of which are hereby incorporated by reference in their entirety.

This invention describes an improved flow reactor and improved reaction systems. This invention may also be used for inline mixing systems.

The term process material refers to the material which is to be changed or mixed within the reactor. The process material may be a paste, an emulsion, solids, liquid, vapour, gas or supercritical fluid. It may also be a combination of the above.

The term reactor refers to the hardware in which a reaction is performed. The term reaction system refers to a containment system in which a process material is modified (i.e. undergoes a reaction). The nature of the change in the process material within the reaction system (or reactor) may be chemical, physical or biological.

The term baffle within this document refers to inserts within the cell which can direct flow. Alternatively they may be used to set the working capacity of the cell.

The term flow describes an operating mode whereby process material passes through the reactor. The flow may be continuous or intermittent, continuous flow being preferred. The process material may pass through the reactor at constant velocity or it may flow at different velocities as it progresses through the reactor. It may for example flow through a series of cells connected by smaller channels.

For the purposes of this document, the term plug flow describes a flow condition where the process material travels at uniform velocity through the system. Plug flow is an idealised concept and in practice some variation in velocity is inevitable due to such factors as changes in process material direction or drag between process material and solid surfaces or agitation. It should be noted that a system of the type described here is a series of stirred cells and is therefore not a plug flow system in the conventional sense. In a system where there were a very large number of stirred cells in series, however, the flow condition would begin to approach the conventional plug flow condition. In this case, the reference to plug flow is intended to convey the desire for a flow profile whereby one process molecule has a similar residence time to any other molecule.

The term cell refers to a chamber which holds process material and is separated from another chamber by an inter-cell conduit. It may also be a single chamber on an agitated assembly which holds process fluid. A cell often has a means of agitation.

The channels which connect cells together are called inter-cell conduits. The inter cell conduits are provided so that the product can flow through a series of cells one after the other. The usual purpose of the inter cell conduit is to minimise back mixing between two cells.

The purpose of this invention is to create a multi cell assembly where the cells of the reaction system are connected by inter-cell conduits and the system is agitated by a means which does not require a mechanical shaft connecting the agitating elements within the cell and the drive mechanism which is outside the cell.

The capacity of the reaction cells is varied by inserting agitated elements or static baffles to displace a given volume of the cells. This allows the cell sizes to be adjusted.

The phrase agitated assembly is a fully contained component with a process inlet pipe and a process outlet pipe and one or more cells. An agitated assembly can be connected to another agitated assembly by means of a pipe or conduit. Normally, an agitated assembly can be dismantled without affecting the containment integrity of another agitated assembly. An agitated assembly may provide a single stream for the flow of process material or it may provide a series of parallel streams for process flow. The conduit volume between two agitated assemblies will generally be larger than the preferred volume of an inter-cell conduit within the assembly. The size of the conduit has to take account of the possibility of blockage or because the system operates over a wide range of flow rates. The mechanism for causing the agitated assembly to vibrate or shake may serve one or multiple agitated assemblies so that each assembly may be vibrated individually or two or more assemblies may be vibrated together.

The term system refers to one or more agitated assemblies which together perform a unit operation on one or more process streams. Where multiple agitated assemblies are used, these may be arranged in series or parallel or a combination of series and parallel. Even where these are done in parallel, these are essentially component parts of a single process stream. There are practical reasons why systems are broken up into multiple agitated assemblies (such as flexibility, versatility, standardisation, physical size limits etc).

An agitator element is a freely moving component within an agitated assembly. The agitator element provides agitation when the assembly is shaken, alternatively a variable magnetic field may be applied to cause the agitation.

The agitator element or elements provide agitation by virtue of being shaken. Agitation can rely on the cell or cells containing materials of two or more densities. The difference in densities may arise from having a combination of solids liquids or gases of different densities and these may be in the form of droplets, bubbles, particles, large solid objects or pockets.

The agitator element may also be magnetically driven.

The term agitation generally refers to the agitation of process fluid. Where the system is provided with a temperature control system such as a jacket containing a heat transfer fluid agitation of the heat transfer fluid is also desirable and usually necessary however this can usually be done by creating turbulence or static mixing.

This document sets out preferred design principles for systems using agitated assemblies. The reasons behind these design principles are explained. However it must also be recognised that compromises to these design principles will have to be made in many cases for practical design reasons. For example, an inter-cell conduit may have to be larger than ideal to reduce the chances of blockage. There are numerous other such examples.

This invention applies to systems where the process material flows through the system from one cell to the next. The flow through the cells is usually continuous although in some cases, the flow through the cells may stop intermittently or may utilise an oscillatory flow pattern.

This invention particularly applies to systems which are liquid filled (or which contain a combination of liquids and solids). Gas may also be present, as a reactant, a product or a component to promote or assist the process change. This invention can also be used for systems which have gas layers or bubbles in the cells. In such cases, agitation can be achieved without a solid agitated element.

This invention applies to systems where the process material does not liberate or absorb heat. More preferably, this invention applies to processes which are exothermic or endothermic.

This invention applies to operations where the change in the process material is simple to reverse (such as changes in temperature or pressure). More preferably, this invention applies to processes which are not simple to reverse (e.g. chemical reactions, biological processes, mixing processes) plus reversible chemical reactions. More preferably, this invention applies to operations where there is some form of chemical reaction (e.g. chemical reactions, polymerisation reactions, isomerisation reactions etc) or biological change.

This invention applies to operations where the process material moves through the reactor in a plug flow fashion as hereinbefore described, although it is not a plug flow system in the strictest sense of the phrase. The reaction cells are a series of mixed cells and plug flow is considered to occur when substantially all the molecules or particles or process material have substantially similar residence times within the reactor.

The flow reactors described in this invention will usually have some means to add or remove heat from the process fluid. In some cases, the reactors may not have the means to add or remove heat. This would apply to systems where the process material can tolerate the temperature changes it encounters as it passes through the system.

This invention is aimed at creating better agitation in flowing or intermittently flowing process systems. Many process systems perform better when the agitation of the process fluid is increased. Increased fluid agitation promotes good heat transfer conditions between the process material and a heat transfer surface. Increased fluid agitation may also improve mixing of the process material. Increased fluid agitation may also improve mass transfer conditions between two different materials. Increased fluid agitation may also promote faster process change where catalysts are being used. Increased fluid agitation in flowing systems is conventionally achieved by various methods as follows:

(a) In some systems, adequate agitation of process fluid is achieved by having a high net mass flow of process material through the system.

(b) In some systems adequate agitation of process fluid is achieved by making the process fluid follow a longer flow path. This increases the velocity of the fluid without increasing the net flow of process material flowing through the system. This can be achieved by various means such as the use of baffles.

(c) In some systems, adequate agitation is achieved by causing different parts of the flow channel to intercept with each other at an angle. This can be achieved with surface profiling or with baffles.

(d) In some systems, the level of agitation of the process fluid is increased by mechanically stirring the process fluid. Agitating element may be coupled to a drive mechanism by a magnetic method or by a shaft with a seal.

(e) In some systems, the level of agitation of the process fluid is increased by employing oscillating flow. The oscillations referred to in this case are those which are caused by transient reversals in the direction of the process fluid flow. The flow reversals for example may be achieved by such means as a pulsation device or reversible gear pump.

In the examples above (a), (b) and (c) are all limited to a minimum or specified flow range. The purpose of this invention is to provide a means of increasing the agitation of the fluid within the system in a manner which does not require a minimum or specific mass flow of process material (although such a minimum may be specified).

The purpose of this invention is to provide a means of increasing the agitation of fluid within the system without requiring a mechanical coupling to the drive mechanism (which is outside the cell) as shown in (d) (Although mechanical couplings to the outside may be used). This eliminates the need for shaft seals or glands (to prevent process material from leaking out).

The purpose if this invention is to provide a means of increasing the agitation of fluid within the system that does not require reversing the flow of process material as shown in (e) (although reversing of flow may be employed if required) The disadvantages with oscillating flow is that it can lead to increased back mixing and increased pressure drop across the system. The level of agitation from oscillating flow may be less vigorous than desired (especially on larger systems) and may require undesirably high pressure drops to achieve the flow reversals. This invention does not rely on oscillating flow, however, it may use it where this is deemed desirable.

The purpose of this invention is to provide a means of increasing the agitation of the fluid within the system by moving one or more agitated elements within the system. This is achieved by shaking or vibrating the system. This may be achieved by connecting the reactor or system to a vibrating table, vibrating arm, rotating cam or some other means of promoting mechanical movement.

The movement of the agitator elements may also be achieved using agitator elements which are magnetically coupled to a mechanism outside the cell or cells. This essentially achieves the same outcome. Although the rest of this invention refers to shaken or vibrated systems, the concept of magnetic agitation is also applicable.

The mechanical device which generates the vibration or shaking action may use compressed air, an air motor, a linear electric motor, a rotary electric motor, or electro magnetic force. It may also use other methods such as hydraulic power.

In some cases, it may be desirable to mount agitating assemblies in two or more groups where the vibrating devices are moving in a different phase to each other. The purpose of this is to help reduce the overall movement of the system and also in some cases the tendency for reverse flow.

The direction of oscillation maybe in the direction of fluid flow or it may be at 90° to the direction of flow. The oscillation may also be any other direction or it may move in an orbital fashion. The oscillation may also involve a twisting or rocking action, or even random movements. The oscillation may be a combination of the above.

The degree of vibration or shaking has an impact on the effectiveness of the agitation. For processes which have 'fragile process materials' or do not require strong agitation, a vibration speed of less than 1 cycles per second will be used (although faster or slower speeds may be used). In some cases this may be less 0.5 cycles per second and in other cases less than 0.1 cycles per second. For processes which require vigorous agitation, vibration speeds of more than 0.5 cycles per second will be used. In some cases this will be more than 5 cycles per second. In some cases this will be more than 50 cycles per second.

Since many vibrating assemblies will be liquid filled systems, a shaking action alone will not significantly affect agitation. For these applications, the addition of an agitator element can be used to promote agitation. The agitator element is a free moving material of a different density to the process material. In some cases, the agitator element may itself be process material (such as in gas/liquid systems or systems with liquids of two densities).

Figure 1:
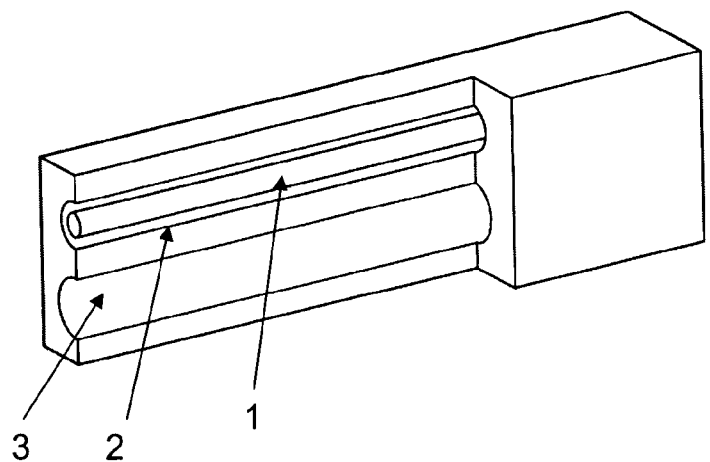
FIG. 1 illustrates a system with a single agitator element.

An example of a system with a single agitator element is shown in FIG. 1. Where item (1) is the agitator element, (2) is the process material cell and (3) is the conduit for heat transfer fluid. Process fluid flows through the process material channel and the whole assembly is mounted on or connected to a vibrating mechanism. In this system, the agitator element is a rod which is shaken up and down.

Figure 2:
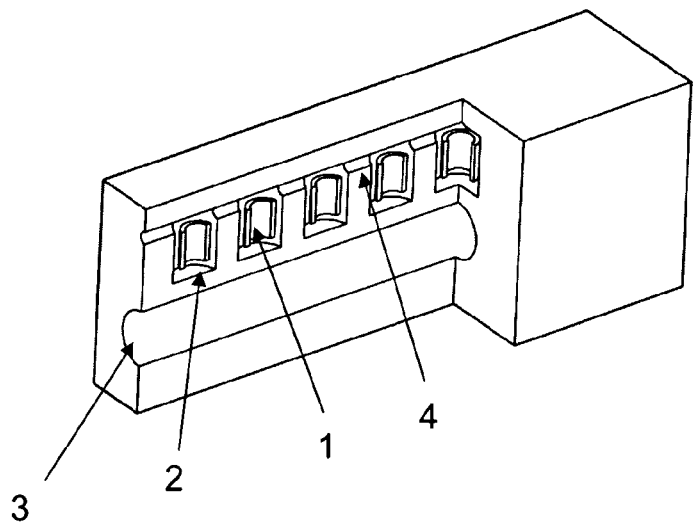
FIG. 2 illustrates a system with multiple agitator elements.

An example of a system with multiple agitator elements is shown in FIG. 2. Item (1) is one of the agitator elements, (2) is the cell, (3) is conduit for heat transfer fluid and (4) is the inter-cell conduit. Process fluid flows through the inter-cell conduit from one cell to the next and the whole assembly is mounted on or connected to a vibrating mechanism.

The agitated assembly can be fabricated in metal or plastic. The plate for the agitated assembly could be fabricated in two parts as shown in FIG. 2 or it could be fabricated as a sandwich where the inner part has holes drilled for the cells and plates on the outside. The inner part could be metal or plastic. The outer leaves could be of a different material (such as chemical resistant metal).

In FIGS. 1 and 2, the heat transfer channel 3 is shown for illustrative purposes. Many other configurations of heat transfer fluid conduit can be used. The agitated assembly may have a heating/cooling system in the form of a jacket, cooling coils, or plates or a combination of these. The connection for the heating/cooling fluid will be by flexible pipes or rigid pipes which can tolerate the vibration or shaking action. The agitated assembly may have a heating/cooling system in the form of a cooling/heating bath into which the agitated assembly is immersed. The agitated assembly may sit within a basket or frame within the bath. The agitated assembly may have a heating/cooling system in the form of an aluminium plate or copper plate (or some other thermally conductive material) which is clamped to the surface of the agitated assembly (and is itself immersed in a heating or cooling medium or has a heating or cooling medium within it). In some cases the heating or cooling medium may be air. Where the agitated assembly does not have an internal heating cooling fluid, it may have fins (or other means of increasing the externally surface area) to increase the heat transfer area between the heating or cooling medium and the agitated assembly.

The size of the agitator element can be varied to modify the volumetric capacity of a cell. This allows the user to modify the heat transfer area to process volume ratio (or the residence time of the process fluid). In FIG. 1, the diameter of the element could be increased for example to reduce to volumetric space for process material. In the case of FIG. 2, the hole size or the outer diameter of the agitator element could be altered. One or more agitator elements may be provided in a cell and the number of agitator elements in the cells may be varied.

Figure 3:
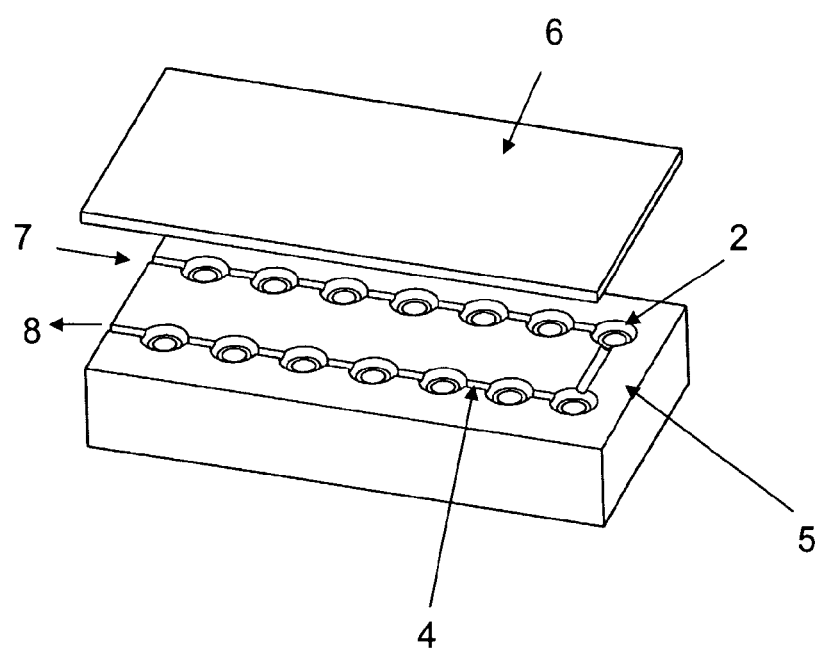
FIG. 3 shows a block with the cover removed to show several cells and inter-cell conduits.

FIG. 3 shows a block (5) with the cover (6) removed to show several cells (2) and inter-cell conduits (4). FIG. 3 also shows the inlet (7) and outlet (8) for the process material.

Where gas bubbles are used to promote mixing rather than agitator elements, the volumetric capacity of a cell may be modified by using static inserts. These are immobile inserts which reduce the cell volume by the required amount (this document also refers to baffles performing this function).

By varying the size of the agitator element or static insert to vary the volumetric capacity of a cell, the user can control the degree of conversion within each cell. For example the user can ensure that, within a series of cells, each cell performs approximately the same amount of conversion. Alternatively, the user can ensure that, within a series of cells, each cell has approximately the same heat load (in most cases similar heat loads will be comparable to degree of conversion).

Where the user wishes to specify a given conversion profile within a series of cells, the appropriate size of the agitator elements or static inserts can be verified by means of a heat balance calculation. More simply, in cases where a uniform cooling jacket is used, the size of the agitator elements or static inserts can be verified by measuring the temperature or each cell.

The agitator element may be free floating or tethered by a hinge or flexible connection. It may also slide up and down a channel.

The shape of the agitator element can be varied according to need. It can be cylindrical, spherical, square, oblong or any other shape. It may also have flutes inscribed on it or geometry so as to make it rotate as it moves.

The agitator element may be of a catalytic material (or enzyme) or have a surface covering which is a catalytic material (or enzyme). The material may be covered over the whole surface or restricted to specific areas to minimise abrasion (such as the inner surface of a hollow cylinder).

The agitator element may also be a porous plug of catalytic material such that the process fluid can pass through the porous material as the agitator element moves.

The material of the agitator element can be metal, plastic, rubber or many other materials. The agitator elements may also be coated. In some cases this may be used for reasons of cost or to benefit from the properties of two materials (e.g. coating for chemical resistance and metal core for increased density). The agitator element may be of a softer material than the body of the system so as to reduce wear. PTFE is a good material to use in chemically hostile environments. Rubber or rubber coating is good for resisting wear.

The use of multiple cells is an effective way of achieving agitation at any net mass flow through the system without causing unwanted back mixing. The smaller and more numerous the cells are, the closer they approach plug flow conditions. Whilst a large number of cells are desirable, cost and complexity increases as more cells are used. A system may have 1 or more agitated cells. A system may have 2 or more agitated cells. A system may have 4 or more agitated cells. A system may have 8 or more agitated cells. A system may have 16 or more agitated cells. A system may have 20 or more agitated cells. A system may have 50 or more agitated cells. A system may have 100 or more agitated cells. Some systems may have 500 or more agitated cells. Some systems may have 1000 or more agitated cells. Some systems may have 10,000 or more agitated cells. A large number of options are shown in this paragraph. The reason for this is that a system may be scaled up by three or more orders of magnitude. Thus a process run at the industrial scale will require a much greater number of cells than a lab system (if a similar size and residence time per cell is to be used on the scaled up plant). Alternatively larger cells could be used.

A single agitated assembly may only have a single cell. More preferably it will have 2 or more cells, more preferably it will have 4 or more cells or more preferably it will have 8 or more cells or more preferably it will have 10 or more cells. An agitated assembly with 20 cells is more preferable. An agitated assembly for pilot plant use and above can use 100 cells or more. It may have more than 200 cells or more. An agitated assembly for large scale plant use may have 1000 cells or more. In some cases, larger systems will employ a relatively small number of large cells.

A system may have different cell sizes so as to give different cell residence times and/or different cell heat transfer area to process volume ratios at different points within the system. This can be beneficial where the rate of process change is varying.

A system may have cells with different agitator element sizes (or static elements) so as to give different cell residence time and/or different cell heat transfer area to process volume ratios at different points within the system. This can be beneficial where the rate of process change is varying.

A system may have cells with different baffle sizes so as to give different cell residence times and/or different cell heat transfer areas to process volume ratios at different points within the system. This can be beneficial where the rate of process change is varying.

A system may have a combination of some cells with agitator elements and some without, some cells with baffles and some without (or a combination of these). The reason for varying the baffling and agitator elements is that the needs of the process may be different at different points within the system. For example, a process which can liberate a lot of heat at the outset may operate better by not agitating it initially. By not agitating at the beginning in this way may result in a slower initial reaction thus making it easier to prevent the process material from overheating in the initial stages.

In many cases it will be desirable to use multiple cells on a single agitated assembly as shown in FIG. 2.

The flow pattern through the system is generally such that the cells are fully mixed but the flow trajectory within the inter cell conduits is substantially unidirectional although some reverse flow may be tolerated.

Where multiple cells are used, reverse flow within the inter-cell conduit may be reduced or prevented by a non return device such as ball or flap.

Where multiple cells are used, it may be desirable to have sufficient pressure drop within inter-cell conduits in relation to the pressure effects caused by the movement of the agitator elements (or pumps) to avoid reverse flow. This reduces the tendency for back flow within the inter-cell conduit. It is desirable that the pressure drop across the inter-cell conduits is greater than the pressure effects caused by the agitator elements, more preferably twice the pressure effects caused by the agitator elements and more preferably 10 times the pressure effects caused by the agitator elements.

Where agitation is used, the fluid in the cells benefits more than the fluid in the inter-cell conduit. It is therefore desirable that the cell volume is high in relation to the inter-cell conduit volume. Whilst there will be exceptions to this (especially where the cell volume is different at different points within the system), it is desirable that the cell volume is greater than the inter-cell conduit. It is more desirable that the cell volume is greater than 5 times the conduit volume, more preferably 10 times the conduit volume, more preferably 50 times the conduit volume and even more preferably 100 times the conduit volume.

The inter-cell conduit volume should be equal to or greater than the volume of reverse flow (which is caused by pressure effects in relation to the flexibility of the system shell or ability of the delivery system to withstand reverse flow). More preferably the inter-cell conduit volume should be twice the volume of reverse flow or more preferably 5 times the volume of reverse flow.

A short inter-cell conduit length can result in reverse flow by diffusion. The length of the inter-cell conduit should be as long as the largest other dimension (width, height or diameter) more preferably twice as long and more preferably (subject to other factors being satisfactory) five times as long. The velocity of the fluid through the inter cell conduit should be faster than the reverse flow caused by diffusion.

Where necessary, the cell can be designed to ensure that some of the process material does not pass straight out of the cell without mixing properly. This can be done by using baffles making the process material follow a longer path through the cell. The baffle can be designed in different ways such as concentric tubes with or without agitator elements (such as concentric rings). Where two concentric rings are used on two concentric tubes within a cell, one sliding ring can go in the direction with the process flow and the other sliding ring could go against the direction of process flow (since the direction of flow of the process material reverses as it travels through the concentric tubes. This will help to reduce pressure pulsing due to the agitator elements.

The agitated assembly may be mounted in the horizontal or vertical plane or at an angle between the two. In a preferred embodiment a mounting arrangement for the agitated assembly such that it can be rotated to give upward flow in the forward direction during filling (and normal running) and downward flow in the forward direction during drain down is provided m. This arrangement allows gas to be displaced during filling. By changing the orientation of the agitated assembly, the system can be drained down without changing the flow direction. The orientation of the agitated assembly may be changed by manual adjustment or may be automatically rotated by some form of electro mechanical device or some other form of actuation.

The inter cell conduits may be cut alternately on different sides of the block to reduce pulsing due to agitation elements.

The process conduit may follow a straight path from one end of the system to other. Alternatively it may go in the form of a U shape so that the inlet and outlet for the process material are at the same end. It can also go in other directions or have multiple changes of direction.

The vibrating assemblies may be linked together in series or parallel (or a combination of the two) to increase capacity or path length.

This invention permits process material to flow through a system whilst maintaining agitated conditions, good mixing and good heat transfer conditions irrespective of net mass flow of process material through the system.

The following is a non-limiting list of possible uses of the invention.

This invention is for use in continuous mixers.

This invention is for use in continuous reactors for chemical reactions.

This invention is for use in continuous reactors for polymerisation reactions.

This invention is for use in continuous bio reactions.

This invention is for use in continuous reactors for reactions using solid catalysts.

This invention is for use in continuous reactors for reactions using liquid catalysts or catalysts carried with the fluid as particles.

This invention is for use in continuous reactors for organic synthesis reactions.

This invention is for use in continuous crystallisation.

This invention is for continuous reactors of any size for example it may be used in reactors where the throughput through the system is less than 1 gram an hour or 100 grams an hour or more, more preferably it is for throughputs of 1 kg and hour or more, more preferably it is for throughputs of 10 kg and hour or more. It is also suitable for through puts of more than 100 kg per hour.

This invention is also useful for relatively quick continuous processes where the residence time is less than 100 seconds, or less than 10 seconds. The reason it is good for very fast processes is that the ratio of process material to surface area within cells can be altered to suit prevailing conditions. This permits lower pressure drops (since the cells only have a high surface to volume relationship where it is needed most).

This invention is for slow processes which take place in more than 100 seconds, it is also for processes which take more than 1000 seconds, it is also for processes which take more than 10,000 seconds, it is also for processes which take more than 100,000 seconds. The reason for this is that good agitation can be maintained irrespective of the rate of throughput of process material and that the inter-cell conduit serves to minimise back mixing under conditions of slow flow. Good agitation is also good for slow processes as it helps to speed them up.

This invention is suitable for continuous reactors for manufacturing pharmaceutical compounds.

This invention is suitable for fast chemical reactions due to its ability to achieve high surface area to process volume ratios (by choosing a large baffle or agitating element)

This invention is suitable for slow reactions of one minute or longer due to its ability to maintain good mixing and liquid agitation with low mass flows through the reactor.

This invention is suitable for slow reactions of ten minutes or longer due to its ability to maintain good mixing and liquid agitation with low mass flows through the reactor.

This invention is suitable for slow reactions of one hundred minutes or longer due to its ability to maintain good mixing and liquid agitation with low mass flows through the reactor.

This invention is suitable for slow reactions of one thousand minutes or longer due to its ability to maintain good mixing and liquid agitation with low mass flows through the reactor.

This invention is particularly useful when used in conjunction with the systems described in WO2006120026, WO2006120027 and WO2006120028.

The invention claimed is:

1. A reactor for treating a flowing process fluid comprising two or more cells connected by intercell conduits through which the process fluid flows, a drive mechanism capable of vibrating or shaking the cell the reactor which is outside of the cells, wherein the mixing within the cells is generated by shaking or vibrating the reactor to move freely moving agitator elements provided within the cells which are not connected to the drive mechanism, wherein the intercell conduits are arranged such that the process fluid flows through the cells one after the other.

2. A reactor according to claim 1 wherein the agitator element is solid and tethered to the cell.

3. A system according to claim 1 wherein the agitator element is solid and tethered to the cell.

4. A system according to claim 1 wherein an oscillating movement or an orbital movement between the agitator element and a drive mechanism is used to generate agitator movement.

5. A reactor according to claim 1 wherein inserts are provided within one or more of the cells to provide the desired volumetric capacity.

6. A reactor according to claim 5 wherein the inserts are of variable size.

7. A reactor according to claim 5 wherein the inserts are agitator elements.

8. A reactor according to claim 1 comprising a heat transfer element for control of the temperature of the process fluid.

9. A reactor according to claim 1 further comprising a heating/cooling system in the form of a jacket, cells, plates, or a combination thereof.

10. A reactor according to claim 5 wherein the cell capacities are varied so as to control the ratios of heat transfer area of the heat transfer element to cell volume at different points within the reactor.

11. A reactor according to claim 1 wherein the flow through the intercell conduits is unidirectional or bidirectional.

12. A reactor according to claim 1 wherein the intercell conduit is sized such that the velocity of the process material through the intercell conduit is equal to or greater than the velocity of reverse flow by diffusion.

13. A reactor according to claim 1 which has 8 or more cells.

14. A reactor according to claim 9 wherein the heat transfer element comprises a heating or cooling jacket containing heat transfer fluid or a heating or cooling bath.

15. A reactor according to claim 3 wherein the agitator element is tethered to the cell by a hinge or flexible connection.

16. A reactor according to claim 1 wherein the cell capacities are varied.

17. A reactor according to claim 1 wherein the volumetric capacity of the cells is modified by varying the size to the agitator elements.

* * * * *